United States Patent
Cui et al.

(10) Patent No.: US 9,832,433 B2
(45) Date of Patent: Nov. 28, 2017

(54) LASER LIGHT SOURCE, METHOD FOR CONTROLLING DUAL COLOR WHEELS OF LIGHT SOURCE, AND LASER PROJECTION DEVICE

(71) Applicant: HISENSE CO., LTD., Qingdao (CN)

(72) Inventors: Rongrong Cui, Qingdao (CN); Xinhong Lin, Qingdao (CN); Jianfeng Li, Qingdao (CN)

(73) Assignees: HISENSE CO., LTD., Qingdao (CN); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/202,797

(22) Filed: Jul. 6, 2016

(65) Prior Publication Data
US 2016/0316183 A1    Oct. 27, 2016

(30) Foreign Application Priority Data

Nov. 4, 2015    (CN) .......................... 2015 1 0738951
Nov. 4, 2015    (CN) .......................... 2015 1 0739594

(51) Int. Cl.
| | | |
|---|---|---|
| *H04N 9/31* | (2006.01) | |
| *G02B 26/00* | (2006.01) | |
| *G03B 21/14* | (2006.01) | |
| *G03B 21/20* | (2006.01) | |
| *G03B 33/08* | (2006.01) | |

(52) U.S. Cl.
CPC ......... *H04N 9/3114* (2013.01); *G02B 26/008* (2013.01); *G03B 21/204* (2013.01); *G03B 33/08* (2013.01); *H04N 9/3158* (2013.01); *H04N 9/3161* (2013.01); *H04N 9/3194* (2013.01)

(58) Field of Classification Search
CPC ...... H04N 9/31; H04N 9/3102; H04N 9/3111; H04N 9/3114; H04N 9/3117; G02B 26/008; G03B 21/005; G03B 21/006; G03B 21/008
See application file for complete search history.

(56) References Cited

U.S. PATENT DOCUMENTS

| | | | | |
|---|---|---|---|---|
| 7,050,120 B2 * | 5/2006 | Allen | .................... | H04N 9/3114 348/742 |
| 7,311,404 B2 * | 12/2007 | Hori | ..................... | H04N 9/3114 348/743 |
| 7,367,680 B2 * | 5/2008 | Goo | ....................... | G03B 21/14 353/84 |
| 7,460,179 B2 * | 12/2008 | Pate | ..................... | G02B 26/008 348/177 |

(Continued)

*Primary Examiner* — William C Dowling
(74) *Attorney, Agent, or Firm* — Harness, Dickey & Pierce, P.L.C.

(57) ABSTRACT

A laser light source is provided. The laser light source includes: a laser device; a first color wheel and a second color wheel, on both of which there are corresponding color regions, wherein the laser device emits laser which illuminates the first color wheel and the second color wheel sequentially, and exits from the color regions on the second color wheel; a first marker and a second marker arranged respectively on the first and the second color wheels; a first sensor configured to detect the first marker, and to generate a first sense signal; a second sensor configured to detect the second marker, and to generate a second sense signal; and a control unit configured to synchronize the first color wheel and the second color wheel.

18 Claims, 8 Drawing Sheets

(56) References Cited

U.S. PATENT DOCUMENTS

| | | | |
|---|---|---|---|
| 7,461,950 B2 * | 12/2008 | Yamanaka | H04N 9/3114 348/E9.027 |
| 9,544,581 B2 * | 1/2017 | Simon | H04N 13/0438 |
| 2005/0212980 A1 * | 9/2005 | Miyazaki | H04N 9/315 348/744 |
| 2007/0065161 A1 * | 3/2007 | Miura | G02F 1/0123 398/186 |
| 2007/0086098 A1 * | 4/2007 | Sekiguchi | G02B 26/008 359/892 |
| 2007/0195207 A1 * | 8/2007 | Wang | H04N 9/3114 348/744 |
| 2007/0296875 A1 * | 12/2007 | Allen | G02B 26/008 348/743 |

* cited by examiner

LASER LIGHT SOURCE, METHOD FOR CONTROLLING DUAL COLOR WHEELS OF LIGHT SOURCE, AND LASER PROJECTION DEVICE

CROSS-REFERENCES TO RELATED APPLICATIONS

This application claims the benefit and priority of Chinese Patent Application No. 201510739594.2 filed Nov. 4, 2015 and Chinese Patent Application No. 201510738951.3 filed Nov. 4, 2015. The entire disclosures of the above applications are incorporated herein by reference.

FIELD

The present disclosure relates to the field of laser light sources, and particularly to a laser light source, a method for controlling dual color wheels of a light source, and a laser projection device.

BACKGROUND

This section provides background information related to the present disclosure which is not necessarily prior art.

A laser light source, which is a solid-state light source, has become an option of an emerging projection light source due to a series of advantages including high luminance, high efficiency, a long lifetime, a good color gamut, greenness, etc.

In an existing light source including laser and fluorescence generated by excited fluorescent powder in the industry, blue laser is typically used as an excited light source of a laser projection system, and also as light in blue which is one of the primary colors including red, green, and blue. A fluorescence wheel is a wavelength conversion device configured to generate light in the other two primary colors than blue light. In an implementation of the prior art, blue laser is emitted onto the fluorescence wheel to excite blue fluorescent powder and yellow fluorescent powder so as to generate blue light and yellow light respectively, where the blue light and the yellow light passes a green light filter sheet and a red light filter sheet of a color filter wheel, thus resulting in green and red light, and blue laser is transmitted directly through the fluorescence wheel, and a transparent region of the color filter wheel without being filtered in color, and enters a light path system, so that the three primary colors including red, green, and blue are output from the color filter wheel as a result.

Moreover some yellow light is typically added to the system for higher brightness, and the yellow right generated by the fluorescence wheel is transmitted directly through the transparent region of the color filter wheel, thus resulting in monochromatic yellow light, so that blue laser passes the fluorescence wheel and the color filter wheel, thus resulting in the monochromatic light in the three respective primary colors, and the monochromatic yellow light. Thus it is necessary to synchronize the fluorescence wheel with the color filter wheel so as to generate the monochromatic light in the three respective primary colors, where only one color is output through the color filter wheel in a timing period, for example, if blue light is output by the fluorescence wheel, then the color filter wheel will be rotated accordingly to the blue light filter region; otherwise, different colors may be output and mixed with each other, and thus altered, and the proportion of the three primary colors may also be varied, so that the three primary colors cannot be timed and output normally.

In the prior art, both of the wheels are synchronized typically in a coaxial design, and as illustrated in FIG. 1, a fluorescence powder wheel 11 and a color filter wheel 12 are connected coaxially, and lie in their respective planes which are parallel to each and placed on an emitted light path of a laser light source 13; and in the dual color wheels, color regions of the fluorescence powder wheel (including fluorescent regions and transmission region, where the color of the transmission region can be regarded as the color of laser transmitted through the transmission region) correspond to three color filter regions distributed on the color filter wheel, and the dual color wheels are rotated in synchronization by driving them into rotation at some frequency using the same motor 14.

In the design above, the boundaries of the same color region in the fluorescence wheel and the color filter wheel need to correspond precisely to each other, that is, projections of the boundaries of that color region in the two wheels onto the axis shall coincide with each other. However this structure may be difficult to assembly in a process, and an offset error occurring in machining and installation will exist all the time because the two color wheels and their wheel axes are fixed. Due to the phenomenon of color mixing due to this error, the purity and the timing at which the colors are output typically have to be guaranteed by removing those mixed components of two colors, which coincide with each other at by some angle, at the cost of lower brightness of the respective monochromatic light.

It is desirable to propose a method for controlling dual color wheels to be synchronized so that the two wheels can be synchronized consistently even if they are not coaxial.

SUMMARY

This section provides a general summary of the disclosure, and is not a comprehensive disclosure of its full scope or all of its features.

An object of the disclosure is to provide a laser light source, a method for controlling dual color wheels of a light source, and a laser projection device so as to address the technical solution of controlling the non-coaxial dual wheels to be synchronized.

The object of the disclosure is attained by the following technical solutions:

An aspect of the disclosure provides a laser light source including: a laser device; a first color wheel and a second color wheel, on both of which there are corresponding color regions, wherein the laser device emits laser which illuminates the first color wheel and the second color wheel sequentially, and exits from the color regions on the second color wheel; a first marker and a second marker arranged respectively on the first color wheel and the second color wheel, wherein a position of the first marker on the first color wheel corresponds to a position of the second marker on the second color wheel; a first sensor configured to detect the first marker, and to generate a first sense signal; a second sensor configured to detect the second marker, and to generate a second sense signal; and a control unit configured to synchronize the first color wheel and the second color wheel according to the first sense signal and the second sense signal.

Another aspect of the disclosure provides a method for controlling dual color wheels of a light source, applicable to the laser light source described above, the method including:

detecting, by the first sensor and the second sensor respectively, the first marker and the second marker, and generating the first and second sense signals; and synchronizing, by the control unit, the first color wheel and the second color wheel according to the first sense signal and the second sense signal.

The disclosure further provides a laser projection device including a laser light source including: a laser device; a first color wheel and a second color wheel, on both of which there are corresponding color regions, wherein the laser device emits laser which illuminates the first color wheel and the second color wheel sequentially, and exits from the color regions on the second color wheel; a first marker and a second marker arranged respectively on the first color wheel and the second color wheel, wherein a position of the first marker on the first color wheel corresponds to a position of the second marker on the second color wheel; a first sensor configured to detect the first marker, and to generate a first sense signal; a second sensor configured to detect the second marker, and to generate a second sense signal; and a control unit configured to synchronize the first color wheel and the second color wheel according to the first sense signal and the second sense signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

The technical solutions according to the embodiments of the disclosure will be described below in details with reference to the drawings.

First Embodiment

The disclosure is intended to provide a method for rotating non-coaxial dual color wheels in synchronization, applicable to a laser light source with a non-coaxial design of the dual color wheels. The laser light source, the structure thereof as illustrated in FIG. 2, includes a laser device 0, a first color wheel 1, and a second color wheel 2, where the laser device 0 emits laser which illuminates the first color wheel 1 to generate fluorescence, and the laser and the fluorescence pass the second color wheel and exit from corresponding color regions on the second color wheel 2 respectively.

Figure 1:
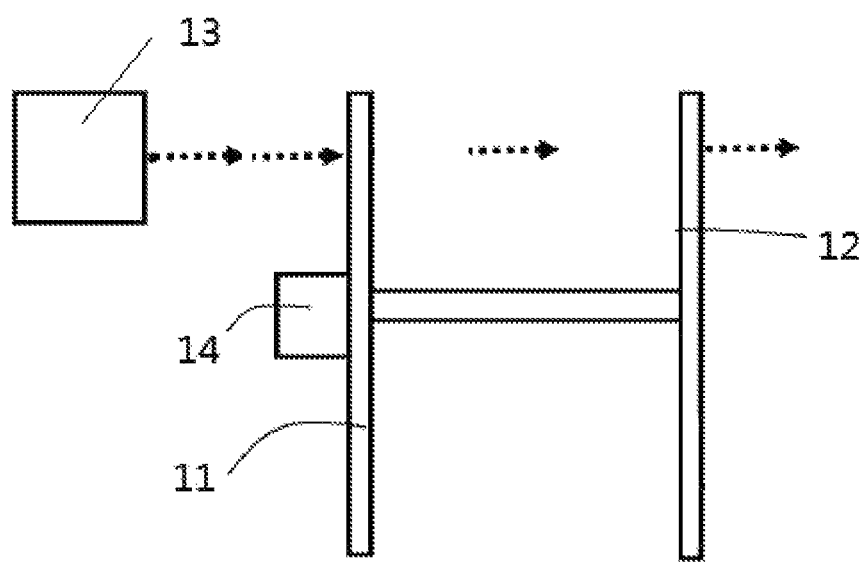
FIG. 1 is a schematic structural diagram of the dual color wheels in the coaxial design.
Figure 2:
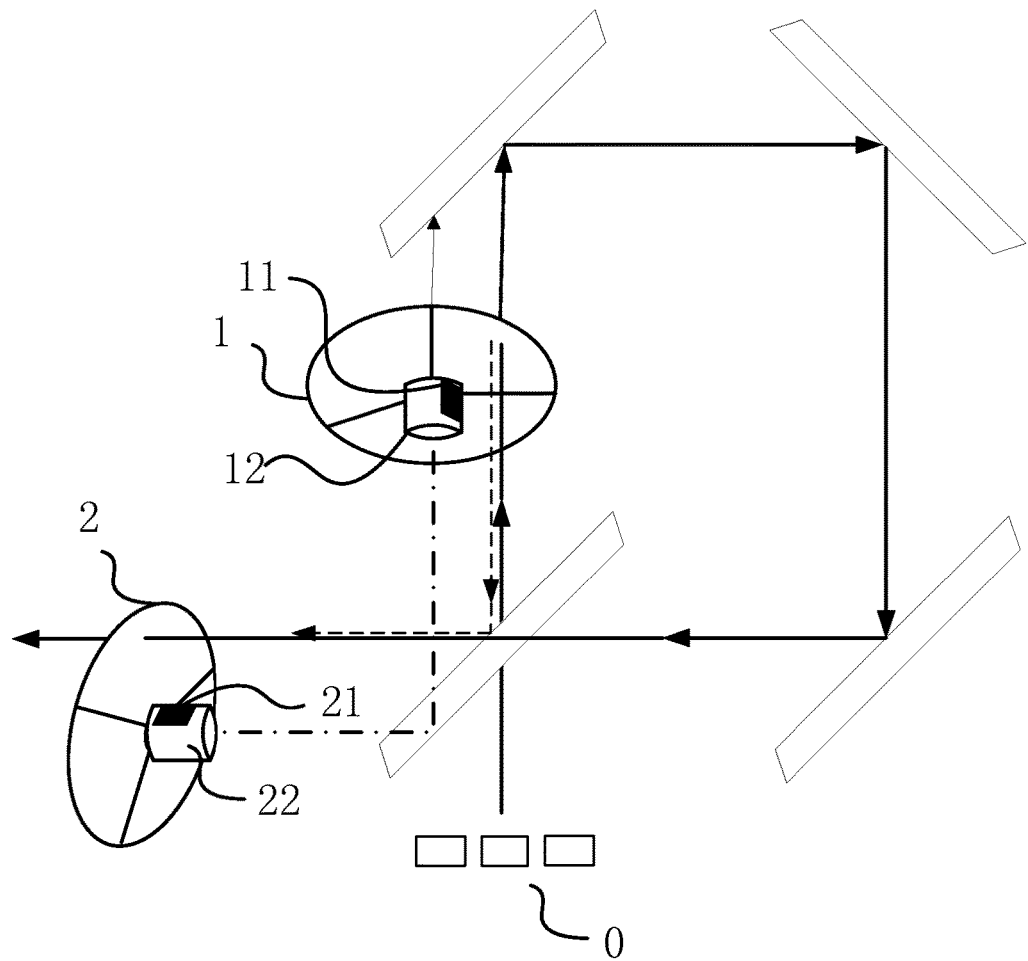
FIG. 2 is a schematic structural diagram of a laser light source including a laser element according to an embodiment of the disclosure.

FIG. 2 illustrates an example of the positional and structural relationship between the non-coaxial dual color wheels, where driving motor shafts 12 and 22 are connected respectively with the first color wheel 1 and the second color wheel 2 to drive their wheel surfaces to rotate periodically. As illustrated in FIG. 2, there is an angle between the extended center lines of the driving motor shafts 12 and 22, where the angle can be a sharp angle, a right angle, or an obtuse angle, although the extended center lines of the driving motor shafts 12 and 22 are perpendicular to each other in this example. That is, the shafts of the first color wheel 1 and the second color wheel 2 are non-coaxial, and accordingly the planes where the wheel surfaces of the two wheels 1 and 2 are not parallel in space but intersect at some angle. In the example illustrated in FIG. 2, there is illustrated only one positional relationship between the first color wheel and the second color wheel, but the embodiment of the disclosure will not be limited thereto.

Here the first color wheel can be a fluorescence wheel on which there are a green fluorescence powder region, a blue fluorescence powder region, and a yellow fluorescence powder region (since red fluorescence powder is excited inefficiently, it is replaced with the yellow fluorescence powder, but the yellow fluorescence powder can still be referred to as the red fluorescence powder region because yellow light from the yellow fluorescence powder is finally filtered into red light). The second color wheel can be a color filter wheel on which there are a green color filter region, a blue laser transmissive region, and a red color filter region. The green color filter region, the blue laser transmissive region, and the red color filter region are distributed respectively on the color filter wheel at the same angles and orders with the green fluorescence powder region, the blue fluorescence powder region, and the yellow fluorescence powder region on the fluorescence wheel, where the red color filter region corresponds to the yellow fluorescence powder region, and is configured to filter yellow fluorescence from the yellow fluorescence powder into red fluorescence, so that the three primary colors including green, blue, and red are output sequentially from the color filter wheel.

Figure 3:
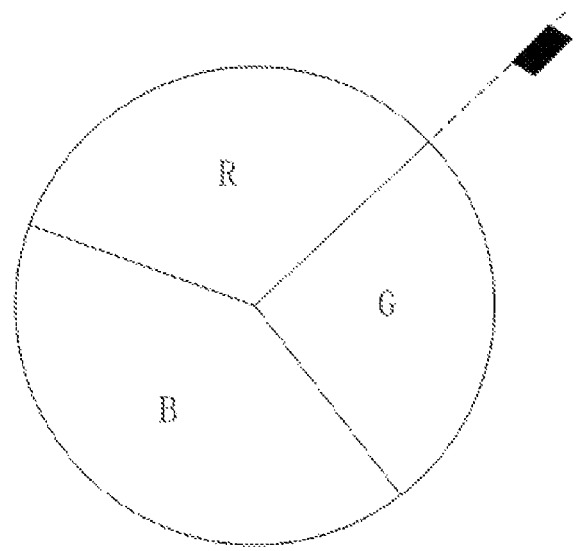
FIG. 3 is a schematic diagram of a correspondence relationship between a color wheel and a marker according to a first embodiment of the disclosure.

Specifically a first marker 11 is arranged on the first color wheel 1, and a second marker 21 is arranged on the second color wheel 2, particularly on the side surfaces of the driving motor shafts of the first and the second color wheels. Moreover the positions of the first marker 11 and the second marker 21 on their respective color wheels correspond to each other. Since there are corresponding color regions on the first color wheel and the second color wheel, typically the positions where the first maker 11 and the second marker 21 are arranged on driving motor shafts 12 and 22 are configured to correspond to some color region on their respective color wheels, so that it can be easily determined whether the two markers correspond in position to each other. In one particular embodiment, the starting position of the first maker 11 on the side surface of the driving motor shaft 12, and the starting position of the second maker 21 on the side surface of the driving motor shaft 22 are aligned respectively with the boundaries of the same color region on their respective color wheels. As illustrated in FIG. 3, for example, if the starting position of a marker is aligned with the boundary of some color on a color wheel, then the boundary of that color will be a reference starting position for the marker on the color wheel. Particularly the starting position of the first marker 11 is aligned with the boundary of the green region in the first color wheel 1, and the starting position of the second marker 21 is aligned with the boundary of the green region in the second color wheel 2. Since the color regions in the color wheels are connected with each other, the boundary in this example refers to a boundary between two colors, and it can be appreciated that the boundary is positioned as the boundary between the green region and the next color region. Those skilled in the art can appreciate and derive that the first marker and the second marker can alternatively be positioned at the boundaries between any other two colors as long as the two colors on the first color wheel are as same as the two colors on the second color wheel.

Figure 4:
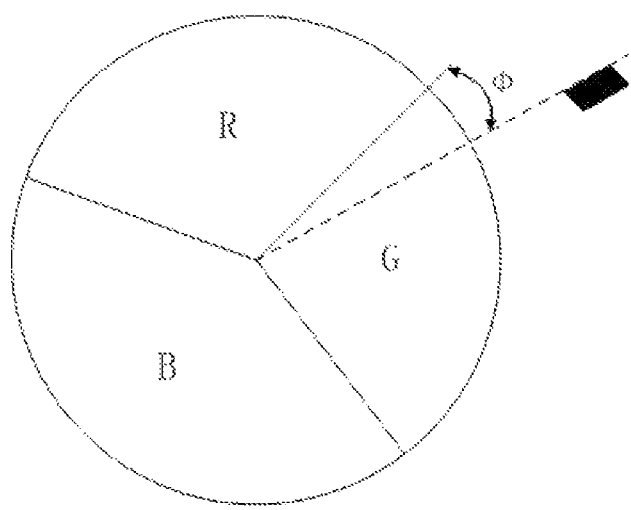
FIG. 4 is a schematic diagram of another correspondence relationship between a color wheel and a marker according to the first embodiment of the disclosure.

Of course, in another particular embodiment, alternatively both of the markers can be shifted by the same distance from the boundaries of the same color, and as illustrated in FIG. 4, the two markers are shifted by an angle φ respectively from the boundaries of the green region on the two color wheels so that the positions of the two markers on the two color wheels also correspond to each other, and at this time, the radial lines shifted by the angle φ respectively from the boundaries of the green regions on the color wheels are the reference starting positions for the markers on the color wheels.

As also mentioned in the Background of the Disclosure, the first color wheel and the second color wheel need to be rotated while their respective color regions correspond to each other, so that if the first color wheel is rotated to the green region, then the second color wheel also needs to be rotated to the green region (corresponding to the real function of filtering in green) so that the color of light exits from the second color wheel is green; otherwise, the colors may be mixed, and their timing may be altered out of order, so the three primary colors cannot be output normally.

A method for controlling the non-coaxial first color wheel 1 and second color wheel 2 in the laser light source will be described below with reference to FIG. 5 together with FIG. 2.

Figure 5:
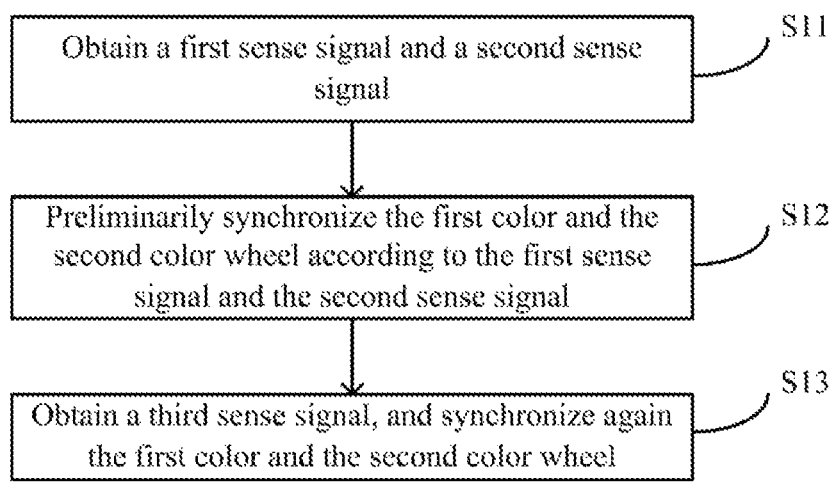
FIG. 5 is a flow chart of a method for controlling dual color wheels of a light source, according to the first embodiment of the disclosure.

As illustrated in FIG. 5, the method includes the following steps:

Step S11 is to detect the first marker and the second marker, and to generate a first sense signal and a second sense signal.

In an embodiment of the method, the makers are black thin films or black adhesive tapes or carbonized markers, where the black color absorbs light in effect, so during the rotation of the driving motor shaft, a signal transmitted by a sensor is absorbed by a black marker on the side surface of the shaft, and reflected back by a part of the side surface of the motor shaft where there is no marker, and thus detected by the sensor. Thus when the sensors detects the rotation states of the first color wheel and the second color wheel, then the sensors can sense the presence of the first marker and the second marker by the optical signal transmitted by the sensors being absorbed and reflected, and to generate pulse signals at low and high levels, so that a first sense signal corresponding to the first marker, and a second sense signal corresponding to the second marker are obtained respectively in the same rotation periodicity.

Step S12 is to synchronize the first color wheel and the second color wheel according to the first sense signal and the second sense signal.

Specifically, a rising edge or a falling edge of the first sense signal and the rising edge or the falling edge of the second sense signal in the same rotation periodicity are compared to determine their time difference, and the rotation speeds of the first color wheel and the second color wheel are adjusted so that the rising edge or the falling edge of the first sense signal coincides with that of the second sense signal to preliminarily synchronize the first color wheel and the second color wheel.

The rotation periodicity here refers to the time taken for the two color wheels to rotate by one round respectively. When the system is initially started up, the two color wheels are accelerated at the same time and in the same direction to the same rotation speed and then rotated at the constant speed, so that the first marker and the second marker are stationary relative to each other, and then the first sense signal corresponding to the first marker, and the second sense signal corresponding to the second marker are generated in the same rotation periodicity.

The first sense signal corresponding to the first marker includes a rectangular pulse representing the rising edge and the falling edge of the first marker, and the second sense signal corresponding to the second marker includes a rectangular pulse representing the rising edge and the falling edge of the second marker.

In one rotation periodicity, if the first color wheel and the second color wheel have not been rotated in synchronization, then there may be a time difference between the rising edge or the falling edge of the first marker and that of the second marker, or there may be a time difference between the first marker and the second marker passing the same position.

Figure 6:
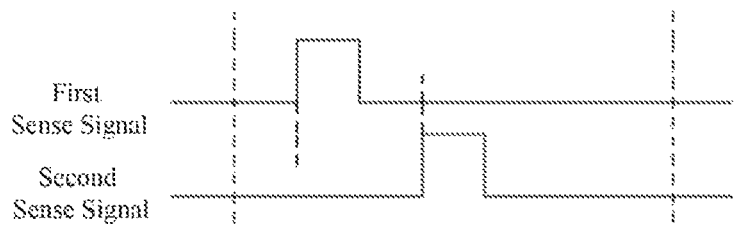
FIG. 6 is a waveform diagram of a first sense signal and a second sense signal in the first embodiment of the disclosure.

As illustrated in FIG. 6, the first color wheel and the second color wheel are rotated by one round, and there is a time difference between the positions of the rectangular pulse corresponding to the first marker, and the rectangular pulse corresponding to the second marker, or there is a time difference between the starting times of the two pulses, or there is a time difference between the ending times of the two pulses, so that the rising edge or the falling edge of the first sense signal does not coincide with the rising edge or the falling edge of the second sense signal in time.

If there is a time difference between the rising edge or the falling edge of the first sense signal and that of the second sense signal, then the rotation speeds of the first color wheel and the second color wheel may be adjusted so that the rising edges or the falling edges of the first sense signal and the second sense signal coincide to preliminarily synchronize the first color wheel and the second color wheel. Particularly as illustrated in FIG. 6, the time difference between the two markers of the two color wheels can be calculated from the first sense signal corresponding to the first marker, and the second sense signal corresponding to the second marker, and the circumference length difference S between the two markers on the two color wheels can be calculated from the time difference as $S=2\pi nRt$, where n represents the rotation speed, R represents the radius from the marker to the center of the color wheel, and t represents the time difference; and when the two color wheels are rotated at the same constant speed, then the two wheels may be stationary relative to each other, so the rotation speed of one of the color wheels may be maintained, and the rotation speed of the other color wheel may be adjusted, thus decreasing the circumference length difference S between the two markers, i.e., the time difference between the two markers; and the adjustment time can be calculated in the equation involving the rotation speed and the circumference length, and the circumference length difference S can be decreased to zero by controlling the adjustment time, so the time difference between the two markers may also be zero, and then the rotation speeds of the two color wheels can be further adjusted to be the same constant speed at which they are rotated, so that the two color wheels can be synchronized. Here the rotation speeds of the color wheels have been adjusted as described above merely by way of an example, but alternatively the rotation speed of one of the color wheels can be maintained, and the rotation speed of the other color wheel can be decreased; and the adjustment time can be calculated to decrease the circumference length difference to zero, and after the difference has been adjusted, the two wheels can be further driven at the same rotation speed.

It shall be noted that in the embodiment of the method, the first marker and the second marker are primarily configured as preset synchronization position markers, and also the rotation speeds of the motor shafts, i.e., the color wheels, can be calculated as a function of the numbers of pulse signals in the same rotation periodicity of the color wheels to thereby detect the rotation speeds of the color wheels. In this way, the rotation speeds of the color wheels can be acquired in real time, and changed by adjusting power of driver circuits, etc.

Figure 7:
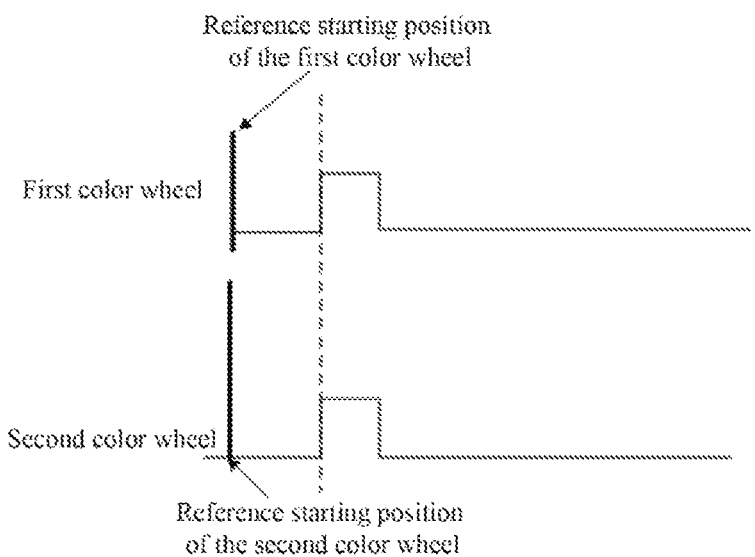
FIG. 7 is a schematic diagram of the dual color wheels prior to synchronization in the first embodiment of the disclosure.

After the two color wheels are controlled to be synchronized in the steps above, given the same position on the color wheels, the positional difference between the pulse signals of the markers of the first color wheel and the second color wheel at the same instance of time as illustrated in FIG. 6 is adjusted so that the rising edges of the sense signals of the markers corresponding to the two color wheels coincide as illustrated in FIG. 7, that is, the two markers are synchronized. Since the first and second markers correspond respectively to the same position on the first and second color wheels, the two color wheels are also substantially synchronized. There are corresponding color regions in the fixed order on the two color wheels, and when the color wheels are substantially synchronized, then the same color regions of the two color wheels being rotated may also correspond to each other, so that they may match each other. For example, when the first color wheel is rotated to the green region, then the second color wheel may also be rotated exactly to the green region, thus outputting green light. As a result of the dual color wheels being synchronized, the light passes the same color regions on the two color wheels sequentially in the same period of time, thus guaranteeing the timing of the respective colors among the three primary colors finally output by the second color wheel.

Figure 9:
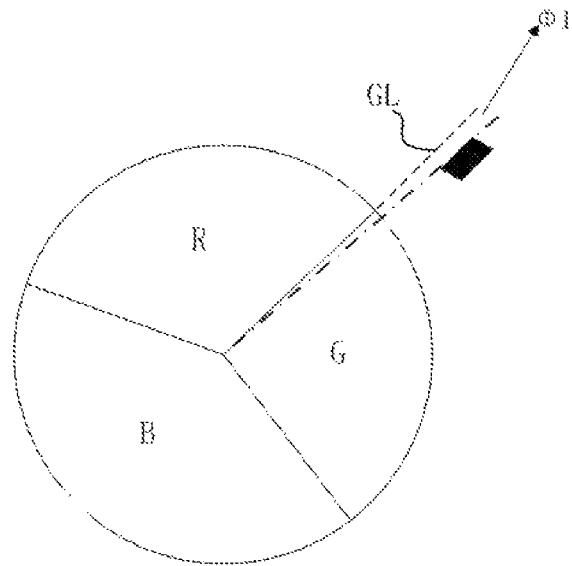
FIG. 9 is a schematic diagram of a marker arrangement error in the first embodiment of the disclosure.

However due to an assembly error, the positions of the first marker and the second marker which are preset synchronization positions may not be completely aligned with the reference starting positions on the corresponding color wheels, e.g., the boundaries of the green regions in FIG. 3, or the position offset by the angle φ from the boundaries of the green regions in FIG. 4, but may be offset from the reference starting positions by an order of millimeters or lower. As illustrated in FIG. 9, theoretical preset reference positions of the markers are the boundaries GL of the green regions, but the preset reference positions may be offset by an angle φ1 from the original reference positions GL after the components are assembled in reality, that is, the markers do not completely coincide with the theoretical preset positions after they are assembled, so the starting positions for the same color on the two color wheels may not be completely synchronized either, and consequently the light emitted by the two color wheels may still pass the different color regions in the two color wheels being rotated while this offset is active; and although the regions insignificantly overlap, the light in the different colors may still be mixed. Additionally this offset may cause not only one of the colors to be mixed, but also the subsequent two colors to be mixed because the respective colors regions are fixed and correspond to each other so that such overlapping or displacement may extend to the other two colors. As a result, if there is some error, then the three primary colors may be mixed in three periods of time in one periodicity.

In an embodiment, the step S13 can be further performed after the first color wheel and the second color wheel are preliminarily synchronized, to thereby prevent the colors from being mixed due to this error so as to synchronize the color wheels more precisely.

The step S13 is to detect an optical signal in an output light path of the second color wheel, to generate a third sense signal, and to synchronize again the first color wheel and the second color wheel according to the third sense signal, where the third sense signal is a voltage signal, the waveform of which corresponds to the optical signal in the different colors.

Since the light source finally output the light in the three primary colors, the laser and the fluorescence are monochromatic light in the three colors; since the sensor detects the optical signal in the output light path of the second color wheel, and generates the third sense signal, the third sense signal is a voltage signal, which includes at least three voltage values of different amplitudes and jumped voltages at the boundaries between the colors; and since there are voltage jumps at the boundaries between the colors because the markers are assembled, i.e., in the periods of time where the colors are mixed, the color wheels can be synchronized again according to the output mixed colors.

In an embodiment, the step S13 particularly includes: step 1) the optical signal is detected, and the third sense signal is generated; step 2) a period of time in which the value of the voltage of the third sense signal jumps is obtained; and step 3) the rotation speeds of the first color wheel and the second color wheel are adjusted until the period of time in which the value of the voltage jumps is below a preset time threshold, to synchronize again the first color wheel and the second color wheel. The detailed description is as follows.

Step 1) the optical signal is detected, and the third sense signal is generated.

Figure 8:
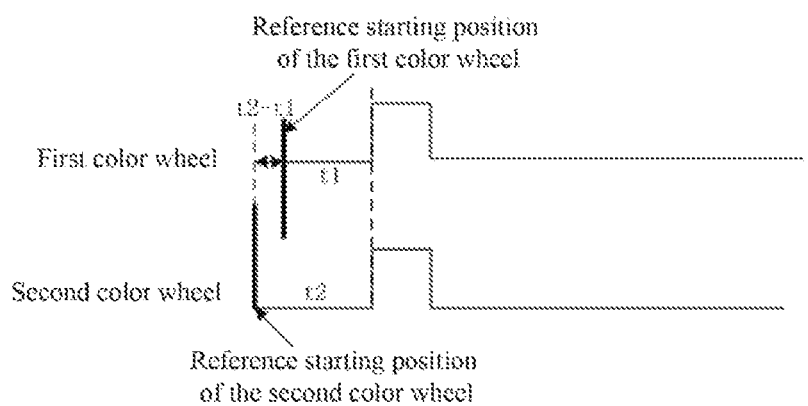
FIG. 8 is a schematic diagram of the dual color wheels initially synchronized in the first embodiment of the disclosure.
Figure 10:
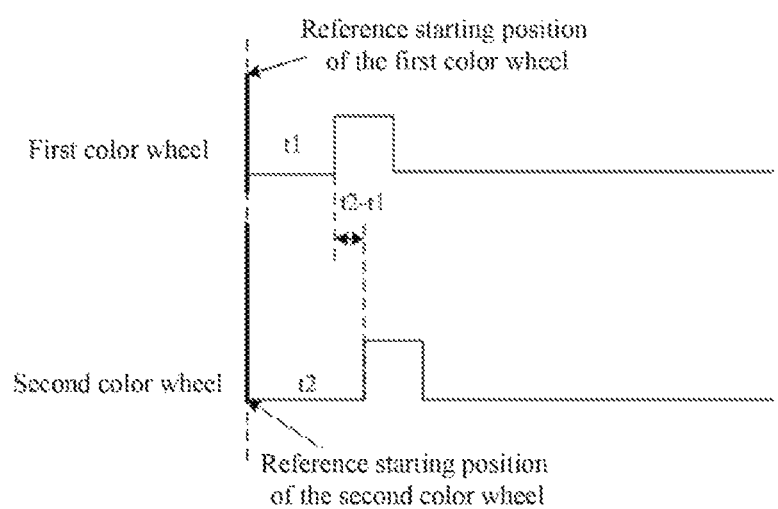
FIG. 10 is a schematic comparative diagram of pulse signals of the dual color wheels corresponding to the marker arrangement error in the first embodiment of the disclosure.

Particularly after the color wheels are initially synchronized, since the first sense signal and the second sense signal correspond respectively to the first marker and the second marker, when the rising edges of the two sense signal coincide, then the first marker and the second marker have been synchronized. However due to the assembly error as illustrated in FIG. 9, after the markers are arranged, the first marker may not be completely aligned with the reference starting position of the first color wheel, and the second marker may not be completely aligned with the reference starting position of the second color wheel, so that although the pulse signals of the markers are synchronized, the reference starting positions of the two color wheels may not completely coincide at the same instance of time. As illustrated in FIG. 8, there is a variable time error t1 between the rising edge signal of the first marker and the reference starting position of the first color wheel, and there is a variable time error t2 between the rising edge signal of the second marker and the reference starting position of the second color wheel, where both t1 and t2 are more than or equal to 0, and when the error between the first marker and the reference starting position of the first color wheel is zero, that is, they are exactly aligned, then t1=0. If t2>t1, then there may be still a variable time error t2−t1 between the first color wheel and the second color wheel after the first sense signal and the second sense signal are initially synchronized. As illustrated in FIG. 10 as an alternative to FIG. 8, referring to the reference starting positions of the two wheels, if the dual color wheels being rotated shall pass these positions at the same instance of time, then the pulse signals of the two markers may be insignificantly misaligned, and there may be a time difference t2−t1, because the markers are offset from the reference starting positions due to the assembly error. Although the error from the markers being assembled lies in an allowable error range, the colors may overlap and thus be mixed in a color range, so for the sake of the colors which are output in reality, the reference starting positions of the first color wheel and the second color wheel shall be adjusted so that they are aligned with each other at the same instance of time to thereby further synchronize the first color wheel and the second color wheel.

The second color wheel outputs the light in the three colors, and the sensor can detect the optical signal in the output light path of the second color wheel and obtain the voltage with at least three different amplitudes, and the jumped voltage at the boundaries between the colors due to the error from the markers being assembled.

Figure 11:
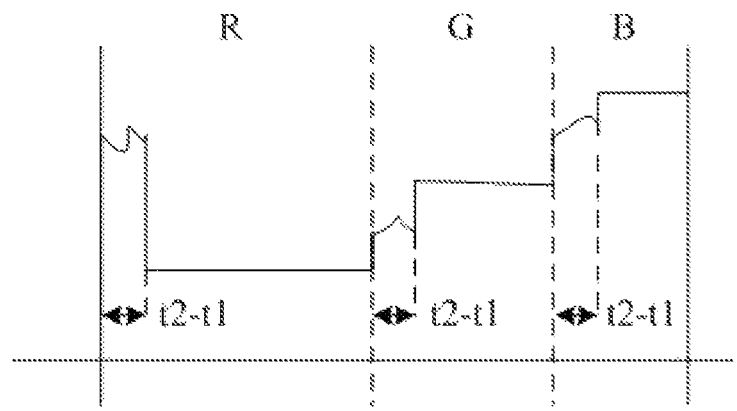
FIG. 11 is a schematic diagram of a voltage waveform of a third sense signal in the first embodiment of the disclosure.

Particularly, the sensor generates a waveform diagram of the third sense signal as illustrated in FIG. 11. The assembly-incurred error is embodied as the abnormally variation of voltage amplitude of the third sense signal, where the third sense signal is a voltage waveform signal, and the optical signal in the different colors has different brightness which can be converted by the sensor into different voltage values, so that the different voltage values in the third sense signal correspond to the different colors among the three primary colors; and since the amplitude of the voltage corresponding to any color light is a certain value, the amplitude of the voltage jumps between any two of the colors, and the mixed colors are embodied as the abnormally varying of the voltage between the two colors.

Step 2) A period of time in which the value of the voltage of the third sense signal jumps is obtained.

The period of time in which the value of the voltage jumps refers to a length of time for which the amplitude of the voltage jumps abnormally. For example, the length of time t2−t1 of the abnormally jumping of the voltage amplitude across the two colors can be determined from the waveform as illustrated in FIG. 11, where the length of time of the abnormally jumping is the period of time in which the value of the voltage jumps, and if t2−t1 (i.e., the period of time in which the value of the voltage jumps) is shorter, then the two color wheels are more synchronized, and if the period of time (t2−t1) is 0, then the two color wheels are rotated in exact synchronization.

3) The rotation speeds of the first color wheel and the second color wheel are adjusted until the period of time in which the value of the voltage jumps is below a preset time threshold, to synchronize again the first color wheel and the second color wheel.

The color wheels can be adjusted particularly in the similar way that the first color wheel and the second color wheel are initially adjusted, that is, the time length t2−t1 as illustrated in FIG. 11 is determined, the current rotation speeds of the color wheels are known by counting the numbers of pulses of the markers, and as know from the calculation equation above, the reference starting positions of the two color wheels shall be aligned by adjusting the circumference length difference S, and thereafter the rotation speed of the second color wheel is adjusted with reference to the first color wheel, or the rotation speed of the first color wheel is adjusted with reference to the second color wheel; and after the circumference length difference between the two color wheels, or the time difference between the color wheels is decreased to 0, the two color wheels are adjusted into rotation at the same speed, so that the period of time in which the value of the voltage jumps is below the preset time threshold, and thus the dual color wheels are synchronized again. In an embodiment, if the period of time in which the voltage jumps is 0, then the dual color wheels may be rotated in exact synchronization, thus eliminating the abnormally jumping of the amplitude of the voltage across the two colors, and thus preventing the two color wheels from being out of synchronization due to the error from the markers being assembled.

In the embodiment above, firstly the first color wheel and the second color wheel are initially synchronized so that the positions of the markers of the two color wheels are synchronized, thus eliminating the time difference in sequential order between the markers of the two color wheels being rotated at the same speed, where if the rising edges of their pulses coincide, then the markers of the two color wheels have been synchronized. The color wheels are controlled to be synchronized again, to thereby prevent the different colors from being mixed with each other due to the error between the markers assembled and the reference starting positions, which involves the second fine adjustment made taking into account the real colors emitted by the second color wheel after the positions of the markers are synchronized, so that the dual color wheels are controlled to be synchronized precisely. As compared with the existing method for controlling coaxial dual color wheels, the method for controlling non-coaxial dual color wheels according to the embodiment of the disclosure can control the color wheels to be initially synchronized, according to the sense signals corresponding to the markers preset, i.e., the first marker on the first color wheel, and the second marker on the second color wheel, and can also eliminate the error from the markers being assembled, by eliminating the period of time in which the colors are mixed, the method for controlling color wheels to according to the disclosure is highly flexible and can synchronize the dual color wheels precisely as opposed to the error arising from the same rotation speeds of the coaxial dual color wheels all the time in the prior art. Moreover it is not necessary to prevent the two colors from being mixed as in the solution to the coaxially connected dual color wheels, so the brightness of output monochromatic light can be improved, and also the purity of the colors output by the color wheels, and the hue saturation of the image output by the system can be improved. Also as opposed to the manual adjustment mode, the method for controlling color wheels to be synchronized according to the embodiment of the disclosure can not only save the labor cost, but also eliminate the error in matching the colors, which may arise from different sensitivities of different persons to the colors while adjusting manually the color wheel, so as to greatly improve the precision in matching the colors on the dual color wheels.

Moreover when the reference starting positions on the color wheels are located at the boundaries between the colors, then the starting positions of the first marker and the second marker may also be aligned with the boundaries of the same color on their respective color wheels, so that the extent of synchronization between the two markers can be evaluated according to the sense signals obtained by the sensors, and the rising edges (if an active pulse is a pulse at a high level) or the falling edges (if an active pulse is a pulse at a low level) of the pulses of the sense signals also represent the starting instances of time of the color at the reference starting positions, so that the starting color of the system can be known by determining the arrival of the pulse signals, and since the respective color regions and their order have been fixed on the color wheels, the timing of the colors of the system can also be known. For example, if the reference starting position of the boundary of the green region of the first color wheel is the boundary adjacent to the red region, then the starting position of the first marker will correspond to the boundary of the green region, and accordingly the starting position of the second marker will be aligned with the boundary of the green region of the second color wheel; and if the sensors detect the pulse sense signals of the first marker and the second marker, then the rising edges or the falling edges of the sense signal pulses will represent the beginning of the green color, and the primary colors will be output in the order of green, blue, and red. In a real application, the markers can be aligned with the boundaries between the colors so that while the markers are sensed, the rotation speeds of the color wheels can be measured and compared in synchronization, and also the starting instances of time of the colors, and their order can be determined. Thus if the dual color wheels are synchronized, then the three primary colors can be timed and output normally.

It shall be noted that the above method for controlling color wheels has been described as a method for controlling two color wheels to be synchronized only by way of an example, but if high illumination is required, then a number of sets of light sources may be arranged while structuring a number of color wheels or a number of sets of dual color wheels, and the method for controlling color wheels to be synchronized according to the embodiment of the disclosure will also be applicable thereto.

Second Embodiment

Figure 12:
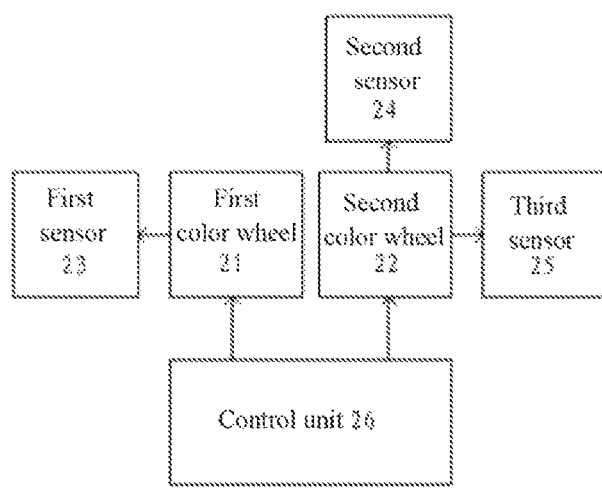
FIG. 12 is a block diagram of a system for controlling dual color wheels of a light source, according to a second embodiment of the disclosure.

Further to the method above for controlling dual color wheels of a light source, an embodiment of the disclosure further provides a system for controlling dual color wheels of a light source, as illustrated in FIG. 12, the system including a first color wheel 21 including a first maker (not illustrated), and a second color wheel 22 including a second marker (not illustrated), where the position of the first marker on the first color wheel corresponds to the second marker on the second color wheel; and a first sensor 23, a second sensor 24, a third sensor 25, and a control unit 26.

Where the first sensor 23 is configured to detect the first marker of the first color wheel, and to generate a first sense signal, and is an infrared sensor or an optical sensor; and the second sensor 24 is configured to detect the second marker of the second color wheel, and to generate a second sense signal, and is an infrared sensor or an optical sensor.

The control unit 26 is configured to synchronize the first color wheel 21 with the second color wheel according to the first sense signal and the second sense signal.

In an embodiment, the system for controlling dual color wheels further includes: a third sensor 25 configured to detect an optical signal in an output light path of the first color wheel, and to generate a third sense signal which is a voltage signal, the waveform of the voltage signal corresponding to the optical signal in the different colors, and the third sensor 25 is an optical sensor or a luminance sensor and placed in the output light path of the first color wheel; and in a particular embodiment, the first color wheel is a fluorescence wheel, the second color wheel is a color filter wheel, and the third sensor is placed in an output light path of the color filter wheel and configured to obtain an optical signal in primary colors output by the color filter wheel as a result of color filtering. The control unit 26 is further configured to synchronize again the first color wheel and the second color wheel according to the third sense signal.

In an embodiment, the control unit is configured to determine time difference between a rising edge or a falling edge of the first sense signal and that of the second sense signal in the same rotation periodicity, and to adjust rotation speeds of the first color wheel and the second color wheel so that the rising edge or the falling edge of the first sense signal coincides with the rising edge or the falling edge of the second sense signal to preliminarily synchronize the first color wheel and the second color wheel.

In an embodiment, the control unit is further configured to obtain a period of time in which a voltage value of the third sense signal jumps, to adjust rotation speeds of the first color wheel and the second color wheel until the period of time in which the voltage value jumps is 0, to synchronize again the first color wheel and the second color wheel.

Particularly referring back to FIG. 2 illustrating the schematic positional and structural diagram of the dual color wheels, the first color wheel 1 and the second color wheel 2 in FIG. 2 are equivalent respectively to the first color wheel 21 and the second color wheel 22 in the embodiment of the disclosure, and the first marker 11 and the second marker 12 in FIG. 2 are equivalent respectively to the first marker and the second marker in the embodiment of the disclosure.

The first marker and the second marker are preset synchronization position markers arranged respectively on the side surfaces of the driving motor shafts of the first and the second color wheels 21, 22, and the markers can be black adhesive tapes or black thin films or carbonized markers, where the black color absorbs light, so the rotation conditions of the first marker and the second marker can be known from the optical signal emitted by the sensors being absorbed and reflected, to determine the rotation conditions of the first color wheel and the second color wheel. The positions of both the first marker and the second marker can be aligned with the reference starting positions on their respective color wheel as illustrated in FIG. 3 or FIG. 4, so a repeated description thereof will be omitted here.

In a particular embodiment, the third sensor 25 is an optical sensor configured to convert a luminance signal into a voltage signal which is the third sense signal, where the third sensor can embody intuitively the light output by the second color wheel in the form of voltage, and the different colors have different luminance, so that the third sense signal is output as a waveform signal with different voltage amplitudes. If the colors are mixed or overlap, then the amplitude of the voltage may vary abnormally in a period of time because luminance signals of the light in the different colors are mixed and converted into different voltage signals.

The method for operating the system has been described in details in the method for controlling dual color wheels of a light source in the first embodiment above, and if the system for controlling dual color wheels according to the embodiment of the disclosure is applied, then its operating process will also bring the advantageous effects as described in the first embodiment, so a repeated description thereof will be omitted here.

An embodiment of the disclosure further provides a laser light source including a laser device, and the system above for controlling dual colors, where the laser device emits laser which illuminates the first color wheel to generate fluorescence, and the laser and the fluorescence exits from corresponding color regions on the second color wheel respectively. Since the first color wheel and the second color wheel are synchronized precisely after being synchronized twice, thus preventing the colors from being mixed, after the light emitted by the laser device passes the first color wheel and the second color wheel, the three primary colors can be output sequentially from the second color wheel without affecting the luminance of the monochromatic light, so that the light source with a high quality can be provided for an subsequent optical device.

Third Embodiment

Further to the laser light source including the system above for controlling dual colors, an embodiment of the disclosure further provides a laser projection device including the laser light source above.

Figure 13:
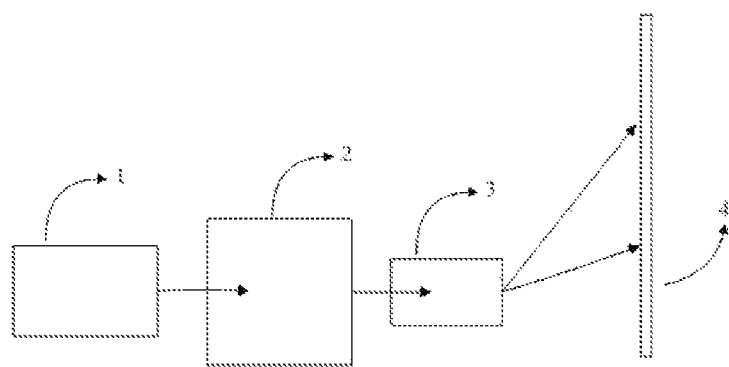
FIG. 13 is a schematic diagram of a laser projection device according to a third embodiment of the disclosure.

As illustrated in FIG. 13 showing a schematic diagram of the laser projection device according to this embodiment, the laser projection device includes a laser light source 1, an optical device 2, a lens 3, and a projection screen 4.

Here the laser light source including the system for controlling dual colors according to the second embodiment can output sequentially light in three primary colors, which enters the optical device 2 through an optical rod (not illustrated), and the optical device 2 further includes a light path conversion element and a DMD (Digital Micromirror Device) chip (neither is illustrated) in addition to the structure of the optical rod. The light in the three primary colors is modulated by the DMD chip, and then refracted again and again, and finally converged into the lens 3.

The projection device in this third embodiment is a projection device with an ultra-short focus, which can be applied at home or portably, so the lens 3 is a lens with an ultra-short focus, which is characterized in that it can project an image with a high quality even at a low projection ratio. Light rays are modulated by the DMD chip and then reach the lens 3, and finally are projected by a set of optical lens elements in the lens 3, including a number of convex lenses, concave lenses, non-spherical lenses, etc., onto the projection screen 4 to form a projected image.

Figure 14:
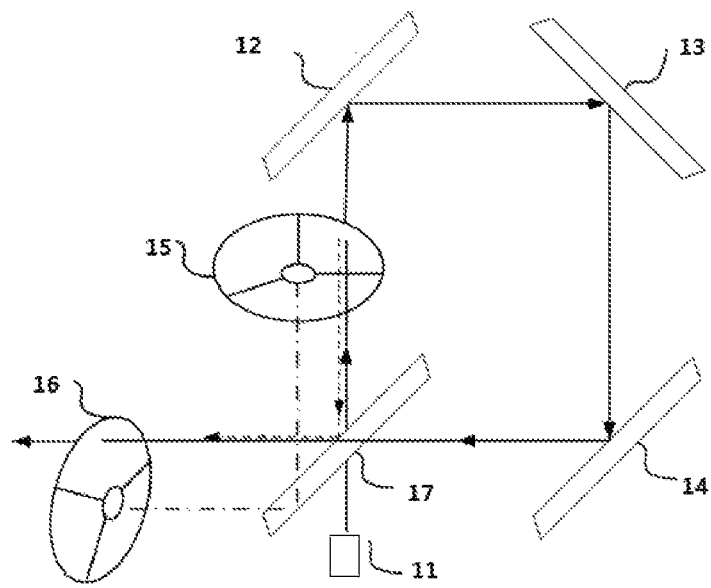
FIG. 14 is a schematic structural diagram of dual color wheels in a laser light source in the third embodiment of the disclosure.

Here as illustrated in FIG. 14, the laser light source 1 particularly includes a laser device 11, a first color wheel 15, and a second color wheel 16; and in the embodiment of the disclosure, the laser device is a blue laser device emitting blue laser and operating as a excitation light source to excite a fluorescence, where the first color wheel is a fluorescence wheel, and the second color wheel is a color filter wheel. The color filter wheel 16 typically includes a first primary color filter region, a second primary color filter region, and a third primary color filter region, and in a particular embodiment, since the laser is highly pure, a corresponding transparent region can be arranged on the color filter wheel to transmit the laser, and since the fluorescence is less pure than the laser, the fluorescence needs to be filtered in color by the color filter in the corresponding color region to thereby further improve the purity of the color; and the fluorescence wheel 15 includes a fluorescence region and a transmissive region, where the transmissive region is typically transparent glass configured to transmit the laser when the fluorescence wheel is rotated to the corresponding position, and the fluorescence region includes blue and yellow fluorescence powder regions (not illustrated) configured to receive the illuminating blue laser, and to be excited to generate green fluorescence and yellow fluorescence. Here the green fluorescence region, the yellow transmission region, and the yellow fluorescence region correspond respectively to the green color filter region, the transparent region, and the red color filter region on the color filter wheel. In the embodiment of the disclosure, the fluorescence wheel 15 and the color filter wheel 16 are designed non-coaxially, and as can be apparent from the figure, the two color wheels are rotated in their planes perpendicular to each other, and although only a particular non-axial arrangement thereof has been illustrated in this embodiment, the embodiment of the disclosure will not be limited thereto.

In this embodiment, the fluorescence wheel 15 is a reflective fluorescence wheel, and after the blue laser is transmitted in the transmissive region of the fluorescence wheel 15, the blue laser further passes a set of relay lenses arranged on the backside of the fluorescence wheel, including a first lens 12, a second lens 13, and a third lens 14 as illustrated in FIG. 14, where these optical lenses include planar reflective lens, convex lens, diffusive lens, and other optical lens, and they form a route along which the blue laser is returned to the front side of the fluorescence wheel, is incident onto an optical mirror 17, and combined with the excited fluorescence.

After the light in the three primary colors is combined, the light further passes the color filter wheel 16 sequentially, and particularly passes sequentially the positional regions in the corresponding colors on the color filter wheel, so that the light in the three primary colors is output sequentially and reaches the optical device behind the laser light source to provide illumination.

After the regions in the corresponding regions on the two color wheels correspond to each other, for example, if the central angle of the green fluorescence region on the fluorescence wheel 15 is 108 degrees, then the central angle of the green color filter region on the color filter wheel may also be set accordingly to 108 degrees, the two color wheels will be further rotated in synchronization so that they are kept stationary relative to each other.

In order to enable the fluorescence powder wheel and the color filter wheel to be rotated in synchronization, the embodiment of the disclosure can be implemented using the method and the system according to the first and second embodiments above: as illustrated in FIG. 2, the first color wheel 1 corresponds to the fluorescence wheel 15 in FIG. 14, and the second color wheel 12 corresponds to the color filter wheel 16 in FIG. 14; and a first marker and a second marker are arranged respectively on the fluorescence wheel and the color filter wheel, and the position of the first maker on the first color wheel corresponds to the position of the second maker on the second color wheel.

A first sensor is arranged around the fluorescence wheel to detect the first marker, and to generate a first sense signal, and is an infrared sensor or an optical sensor; a second sensor is arranged around the color filter wheel to detect the second marker, and to generate a second sense signal, and is an infrared sensor or an optical sensor; and a control unit of the laser device is configured to compare a rising edge or a falling edge of the first sense signal with that of the second sense signal in the same rotation periodicity; and to adjust rotation speeds of the fluorescence wheel and the color filter wheel according to the time difference between the rising edge or the falling edge of the first sense signal and that of the second sense signal so that the rising edge or the falling edge of the first sense signal can coincide with that of the second sense signal, thus initially synchronizing the color wheels. In an embodiment, the laser light source further includes a third sensor placed at the exit side of the color filter wheel, and is an optical sensor or a luminance sensor configured to detect an optical signal, and to generate a third sense signal which represents a detected luminance of the light output by the color filter wheel, i.e., a voltage waveform signal, where optical signal in different colors correspond to different voltage values; and the control unit of the laser projection device is configured to obtain a period of time in which the voltage value of the third sense signal jumps abnormally, and to adjust the rotation speeds of the fluorescence wheel and the color filter wheel until the period of time in which the voltage value jumps abnormally is below a preset time threshold, so that the fluorescence wheel and the color filter wheel are synchronized again. In an embodiment, if the rotation speeds of the fluorescence wheel and the color filter wheel are adjusted until the period of time in which the voltage value jumps abnormally is 0, then the fluorescence wheel and the color filter wheel are controlled to be synchronized precisely.

The first marker and the second marker are preferably black adhesive tapes or black thin films or carbonized markers affixed or spray and coated on the side surfaces of the driving motor shafts of the fluorescence wheel and the color filter wheel.

After the fluorescence wheel and the color filter wheel are synchronized twice so that they are synchronized precisely, the light in the three primary colors output by the color filter wheel will not be mixed in any period of time so that the luminance and the purity of the output monochromatic light can be improved, and further the hue saturation of the colors can be improved; and also the timing of the three primary colors can be guaranteed so that the optical device 2 can be provided with the light source with a high quality to thereby improve the capability to render the colors of the projected image and the quality to display the projected images in the colors.

In summary, in the laser projection device according to the embodiment of the disclosure, the first color wheel, i.e., the fluorescence wheel, and the second color wheel, i.e., the color filter wheel, are arranged non-coaxially, the first marker and the second marker are arranged respectively at the corresponding positions on the fluorescence wheel and the color filter wheel, the first sense signal as a result of sensing the first marker, and the second sense signal as a result of sensing the second marker in the same rotation periodicity are obtained respectively by the first sensor and the second sensor, the rising edges or the falling edges of the first marker and the second marker in the two sense signals are compared, the time difference between the rising edge or the falling edge of the first sense signal and that of the second sense signal is determined, and the rotation speeds of the driver motors driving the fluorescence wheel and the color filter wheel are adjusted to eliminate the positional difference (i.e., time difference) between the two sense signals, so that the first marker and the second marker corresponding to the non-coaxial fluorescence wheel and color filter wheel are initially synchronized. Since there may some errors between the first marker and the second marker, and the preset reference starting positions of their respective fluorescence wheel and color filter wheel while they are assembled, the reference starting positions of the two color wheels may not be completely aligned at the same instance of time due to the assembly error even if the two markers are synchronized, so that there may be temporally inconstant timing, and thus the colors of the light output by the second color wheel may be mixed in some period of time. Accordingly the third sensor can be arranged in the output light path of the color filter wheel to obtain the third sense signal which is a voltage signal, where the light in the different colors correspond to different voltage, and the amplitudes of the voltage corresponding to the light in the two colors jump; and the abnormal voltage occurring while the optical signal in the two colors is jumping corresponds to the period of time in which the different colors are mixed, so the rotation speeds of the two color wheels can be adjusted again to eliminate the abnormal voltage occurring while the voltage is jumping, so as to enable the two color wheels to be rotated in exact precision.

As compared with the prior art, the solutions according to the embodiments of the disclosure can prevent completely the two colors from being mixed at their boundary to thereby improve the precision of synchronization, and since it is not necessary to adjust the color wheels to thereby eliminate the mixed colors, the luminance and the purity of the optical signal output by the light source can be improved, and the timing at which the light in the three primary colors is output can be guaranteed.

It shall be noted that in the embodiments of the disclosure, the operating process of the laser light source has been described by way of an example in which the light source emits the monochromatic light in blue to excite the fluorescence power in two colors so as to generate the fluorescence in the two colors, but the light source can alternatively be a dichromatic laser light source, where the laser light source in each color excites fluorescence power in one or two colors so that light in the three primary colors can be generated as a result. An operating process of the latter light source similar to the operation process in the disclosure above can readily occur to those skilled in the art, so a repeated description thereof will be omitted here.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A laser light source, comprising:
   a laser device;
   a first color wheel and a second color wheel, on both of which there are corresponding color regions, the first color wheel including a fluorescence wheel, the second color wheel including a color filter wheel, wherein the laser device emits a laser which illuminates the first color wheel and the second color wheel sequentially, and exits from the color regions on the second color wheel;
   a first marker and a second marker arranged respectively on the first color wheel and the second color wheel, wherein a position of the first marker on the first color wheel corresponds to a position of the second marker on the second color wheel;
   a first sensor configured to detect the first marker, and to generate a first sense signal;
   a second sensor configured to detect the second marker, and to generate a second sense signal; and
   a control unit configured to synchronize the first color wheel and the second color wheel according to the first sense signal and the second sense signal.

2. The laser light source according to claim 1, further comprising:
   a third sensor configured to detect an optical signal in an output light path of the second color wheel, and to generate a third sense signal which is a voltage signal, a waveform of the voltage signal corresponding to an optical signal in different colors; and
   the control unit further configured to synchronize again the first color wheel and the second color wheel according to the third sense signal.

3. The laser light source according to claim 1, wherein the control unit is configured to determine a time difference between a rising edge or a falling edge of the first sense signal and that of the second sense signal in a same rotation periodicity, and to adjust rotation speeds of the first color wheel and the second color wheel so that the rising edge or the falling edge of the first sense signal coincides with that of the second sense signal to synchronize the first color wheel and the second color wheel.

4. The laser light source according to claim 2, wherein the control unit is configured to obtain a period of time in which a voltage value of the third sense signal jumps, and to adjust rotation speeds of the first color wheel and the second color wheel until the period of time in which the voltage value jumps is below a time threshold, to synchronize again the first color wheel and the second color wheel.

5. The laser light source according to claim 1, wherein the first marker and the second marker are located respectively on side surfaces of driving motor shafts of the first color wheel and the second color wheel.

6. The laser light source according to claim 1, wherein both the first marker and the second marker are black adhesive tapes or black thin films or carbonized markers.

7. The laser light source according to claim 1, wherein both the first marker and the second marker are aligned with boundaries of same color regions on their respective color wheels.

8. The laser light source according to claim 1, wherein both the first sensor and the second sensor are infrared sensors or optical sensors.

9. The laser light source according to claim 2, wherein the third sensor is an optical sensor or a luminance sensor.

10. A method for controlling dual color wheels of a light source, applicable to the laser light source according to claim 1, the method comprising:
    detecting, by the first sensor and the second sensor respectively, the first marker and the second marker, and generating a first sense signal and a second sense signal; and
    synchronizing, by the control unit, the first color wheel and the second color wheel according to the first sense signal and the second sense signal.

11. The method according to claim 10, further comprising:
    detecting, by a third sensor, an optical signal in an output light path of the second color wheel, and generating a third sense signal which is a voltage signal, a waveform of the voltage signal corresponding to an optical signal in different colors; and
    synchronizing, by the control unit again, the first color wheel and the second color wheel according to the third sense signal.

12. The method according to claim 10, wherein synchronizing the first color wheel and the second color wheel according to the first sense signal and the second sense signal comprises:
    determining time difference between a rising edge or a falling edge of the first sense signal and that of the second sense signal in a same rotation periodicity; and
    adjusting rotation speeds of the first color wheel and the second color wheel so that the rising edge or the falling edge of the first sense signal coincides with that of the second sense signal to synchronize the first color wheel and the second color wheel.

13. The method according to claim 11, wherein synchronizing again the first color wheel and the second color wheel according to the third sense signal comprises:
    obtaining a period of time in which a voltage value of the third sense signal jumps; and
    adjusting rotation speeds of the first color wheel and the second color wheel until the period of time in which the voltage value jumps is below a time threshold, to synchronize again the first color wheel and the second color wheel.

14. The method according to claim 12, wherein adjusting the rotation speeds of the first color wheel and the second color wheel until the period of time in which the voltage value jumps is below the time threshold comprises:
    determining a circumference length difference between the first marker and the second marker;
    adjusting the rotation speed of the second color wheel or the first color wheel with reference to the first color wheel or the second color wheel so that the circumference length difference between the first marker and the second marker is decreased to zero; and
    adjusting the second color wheel or the first color wheel into rotation at a same speed as the first color wheel or the second color wheel so that the period of time in which the voltage value jumps is below the time threshold.

15. A laser projection device, comprising a laser light source, wherein the laser light source comprises:
    a laser device;
    a first color wheel and a second color wheel, on both of which there are corresponding color regions, the first color wheel including a fluorescence wheel, the second color wheel including a color filter wheel, wherein the laser device emits a laser which illuminates the first color wheel and the second color wheel sequentially, and exits from the color regions on the second color wheel;
a first marker and a second marker arranged respectively on the first color wheel and the second color wheel, wherein a position of the first marker on the first color wheel corresponds to a position of the second marker on the second color wheel;
a first sensor configured to detect the first marker, and to generate a first sense signal;
a second sensor configured to detect the second marker, and to generate a second sense signal; and
a control unit configured to synchronize the first color wheel and the second color wheel according to the first sense signal and the second sense signal.

16. The laser projection device according to claim 15, further comprising:
a third sensor configured to detect an optical signal in an output light path of the second color wheel, and to generate a third sense signal which is a voltage signal, a waveform of the voltage signal corresponding to an optical signal in different colors; and
the control unit further configured to synchronize again the first color wheel and the second color wheel according to the third sense signal.

17. The laser projection device according to claim 15, wherein the control unit is configured to determine time difference between a rising edge or a falling edge of the first sense signal and that of the second sense signal in a same rotation periodicity, and to adjust rotation speeds of the first color wheel and the second color wheel so that the rising edge or the falling edge of the first sense signal coincides with that of the second sense signal to synchronize the first color wheel and the second color wheel.

18. The laser projection device according to claim 16, wherein the control unit is configured to obtain a period of time in which a voltage value of the third sense signal jumps, and to adjust rotation speeds of the first color wheel and the second color wheel until the period of time in which the voltage value jumps is below a time threshold, to synchronize again the first color wheel and the second color wheel.

* * * * *